US012713076B2

(12) United States Patent
Chen et al.

(10) Patent No.: US 12,713,076 B2
(45) Date of Patent: Aug. 18, 2026

(54) STREAMLINED ADVERTISEMENT INTEGRATION IN MULTI-RAIL SPLICER SYSTEMS

(71) Applicant: Charter Communications Operating, LLC, St. Louis, MO (US)

(72) Inventors: David W. Chen, Aurora, CO (US); Manuel Martinez, Beaverton, OR (US); David E. Agranoff, Golden, CO (US); Vipul Patel, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 381 days.

(21) Appl. No.: 18/523,184

(22) Filed: Nov. 29, 2023

(65) Prior Publication Data

US 2025/0175657 A1 May 29, 2025

(51) Int. Cl.
*H04N 21/234* (2011.01)
*H04N 21/262* (2011.01)
*H04N 21/6405* (2011.01)
*H04N 21/81* (2011.01)

(52) U.S. Cl.
CPC . *H04N 21/23424* (2013.01); *H04N 21/26241* (2013.01); *H04N 21/6405* (2013.01); *H04N 21/812* (2013.01)

(58) Field of Classification Search
CPC ................................................ H04N 21/23424
See application file for complete search history.

(56) References Cited

U.S. PATENT DOCUMENTS

2007/0055983 A1* 3/2007 Schiller ................ H04N 21/235 725/135
2009/0217318 A1* 8/2009 VerSteeg ................ G06Q 30/02 725/32
2015/0341812 A1* 11/2015 Dion .................. H04N 21/6373 370/252
2020/0068232 A1* 2/2020 Lipczynski ...... H04N 21/25891

* cited by examiner

*Primary Examiner* — Michael H Hong
(74) *Attorney, Agent, or Firm* — The Marbury Law Group, PLLC

(57) ABSTRACT

Various methods and processing systems are disclosed that provide a computing device in a multi-rail splicer system for inserting content. The method may include receiving a first cue request message from a first splicer associated with a first rail in the multi-rail splicer system, determining a first splice time value for the first splicer based on a time included in the received first cue request message, receiving a second cue request message from a second splicer associated with a second rail in the multi-rail splicer system, determining a second splice time value for the second splicer, sending commands to insert the content stream into their respective rails at their determined splice time values, multicasting a content stream to the first and second splicers, the content stream including audio, video, and an ad beacon in a data packet identifier (PID), and consolidating content insertion results into a single verification file.

24 Claims, 6 Drawing Sheets

STREAMLINED ADVERTISEMENT INTEGRATION IN MULTI-RAIL SPLICER SYSTEMS

BACKGROUND

Integrating advertisements into media streams (e.g., TV shows, online video streams, etc.) is an important feature in modern broadcasting and media delivery systems. The integration of advertisements requires precise timing and subtle execution to present users with the advertisements without degrading the viewing experience.

Splicers are devices that operate in conjunction with Internet protocol (IP) multicast technologies and specific signals (e.g., SCTE30 and SCTE35) to integrate advertisements in media streams with precision. IP multicast technologies streamline the distribution of streams to allow a single advertisement server to simultaneously broadcast to multiple splicers. SCTE30 signals, messages, or signaling messages may facilitate the synchronization of splicers with broadcasting schedules to help support a more seamless viewing experience. SCTE35 signals may pinpoint the precise moments for advertisement insertion.

Despite recent advancements in splicer and IP multicast technologies, there are a number of limitations and technical challenges associated with related splicers and advertisement insertion systems. For example, related solutions often require a direct and singular connection between servers and splicers, which may lead to increased complexity and resource demands, particularly as systems scale or incorporate redundancy for reliability. These increases in complexity and resource demands may in turn increase the operational costs and complicate content delivery across multiple channels. In addition, errors in signal handling, such as a missed SCTE35 cue, may further disrupt advertisement placement, potentially affecting revenue and viewer satisfaction. New and improved advertisement insertion solutions that offer scalability, reliability, and precise content integration without increasing complexity or costs would be beneficial to content and service providers as well as consumers of their services.

SUMMARY

Some aspects may include methods performed by performed by a server computing device in a multi-rail splicer system to insert content in the multi-rail splicer system, including: receiving, by a processing system in the server computing device, a first cue request message from a first splicer associated with a first rail in the multi-rail splicer system, determining a first splice time value for the first splicer based on a time included in the received first cue request message, receiving a second cue request message from a second splicer associated with a second rail in the multi-rail splicer system, determining a second splice time value for the second splicer, sending commands to the first and second splicers to insert the content stream into their respective rails at their determined splice time values, multicasting a content stream to the first and second splicers, the content stream including audio, video, and an ad beacon in a data packet identifier (PID), and consolidating content insertion results from the first and second splicers into a single verification file.

Some aspects may further include determining whether the second cue request message is received before a time threshold value, wherein determining the second splice time value for the second splicer comprises determining the second splice time value for the second splicer based on one of: a timestamp included in the received second cue request message in response to determining that the second cue request message is received before the time threshold value, or an adjusted time value determined based on a time difference between the first and second splicers from a previous ad insertion break in response to determining that the second cue request message is not received before the time threshold value.

Some aspects may further include consolidating the content insertion results from the first and second splicers into the single verification file comprises consolidating the content insertion results so that: the consolidated result is marked as a failure in response to determining that the content insertion results from the first or second splicer indicate a failure; or the consolidated result is marked as a success in response to determining that the content insertion results from the first splicer or the second splicer indicate a success.

Some aspects may further include consolidating the content insertion results so that the consolidated result is marked as a failure in response to determining that the content insertion results from the first splicer or the second splicer indicate a failure comprises: marking the consolidated result as a failure in response to determining that the content insertion results from the first splicer or the second splicer indicate a failure from an error code that is indicative of a critical failure; and marking the consolidated result as a success in response to determining that the content insertion results from the first splicer or the second splicer indicate a failure from an error code that is indicative of a non-critical failure.

Some aspects may further include consolidating the content insertion results from the first splicer and the second splicer into the single verification file comprises consolidating the content insertion results based on feedback from downstream devices indicating an active rail.

Some aspects may further include determining success of content insertion operations based on a presence of the ad beacon in the PID.

Some aspects may further include multicasting the content stream to the first splicer and the second splicer comprises synchronizing transmission of the content stream with the determined first splice time and second splice time.

Some aspects may further include receiving the first cue request message from the first splicer associated with the first rail in the multi-rail splicer system further comprises monitoring program boundaries in the stream against a schedule and automatically generating the cue request message when the stream approaches a predefined slot for advertisements.

Further aspects may include a computing device having a processing system configured with processor-executable instructions to perform various operations corresponding to the methods summarized above. Further aspects may include a non-transitory processor-readable storage medium having stored thereon processor-executable instructions configured to cause a processing system to perform various operations corresponding to the method operations summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
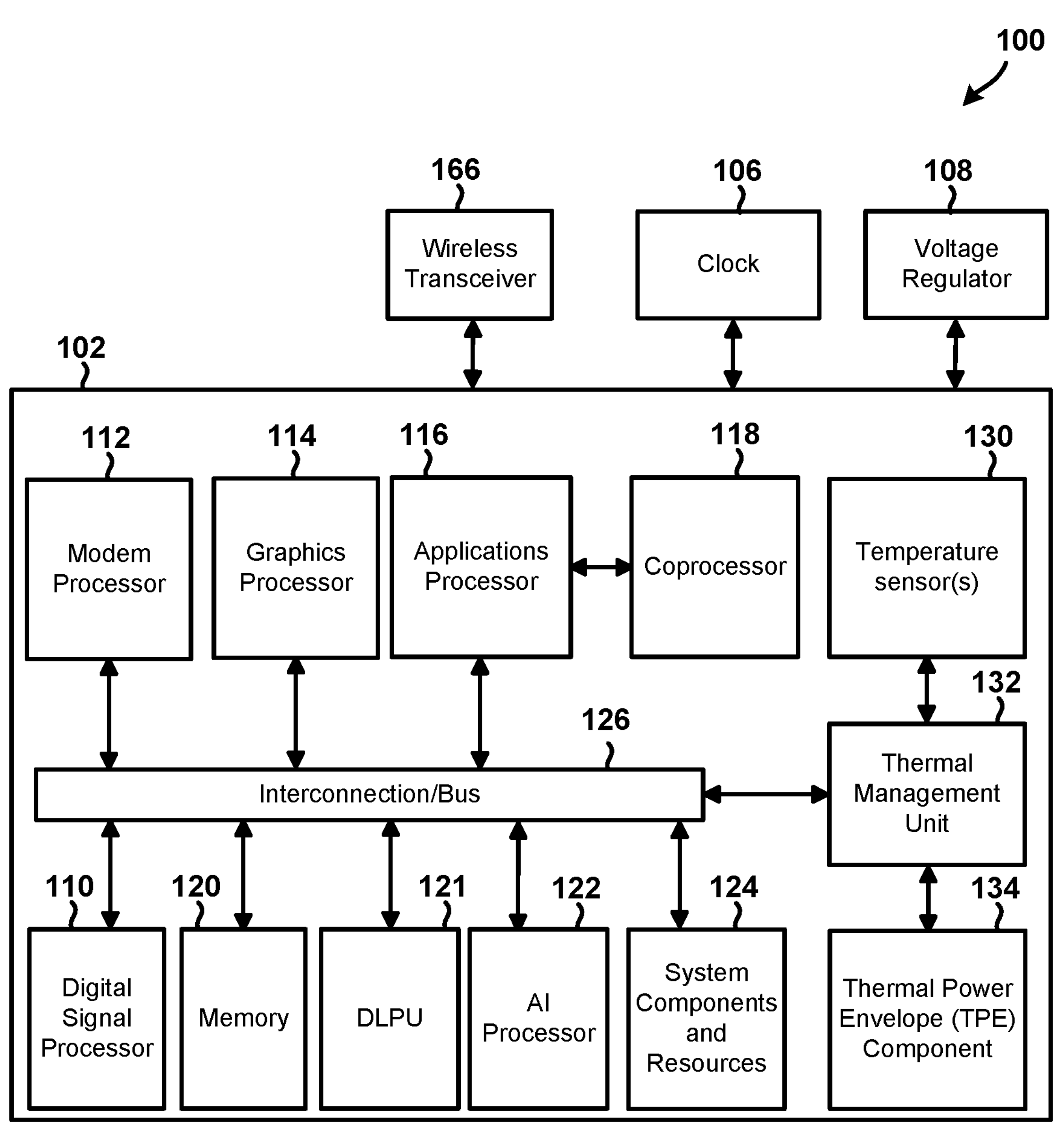
FIG. 1 illustrates an example of a computing system architecture that may be used in a computing system implementing the various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

The embodiments may include or provide an integrated and systematic solution for advertisement distribution in splicer redundancy architectures. The embodiments may improve the performance and function of the network and its constituent components by implementing an advertisement insertion solution that directly addresses the complexity and inflexibility of the conventional systems, streamlines the advertisement insertion process, reduces the potential for errors, and provides robust and continuous service delivery for broadcasting and media organizations.

The term "service provider network" is used generically herein to refer to any network suitable for providing consumers with access to the Internet or IP services over broadband connections and may encompass both wired and wireless networks/technologies. Examples of wired network technologies and networks that may be included within a service provider network include active Ethernet networks, asymmetric digital subscriber line (ADSL) technologies, cable networks, data over cable service interface specification (DOCSIS) networks, enhanced ADSL (ADSL2+), Ethernet, fiber optic networks, fiber-to-the-x (FTTx) technologies, hybrid-fiber-cable (HFC) networks, local area networks (LAN), metropolitan area networks (MAN), passive optical networks (PON), satellite networks, wide area networks (WAN), 10 Gigabit Symmetrical Passive Optical Network (XGS-PON), etc. Examples of wireless network technologies and networks that may be included within a service provider network include third generation wireless mobile communication technology (3G), third generation partnership project (3GPP), 3GSM, fourth generation wireless mobile communication technology (4G), fifth generation wireless mobile communication technology (5G), sixth-generation wireless (6G), advanced mobile phone system (AMPS), Bluetooth®, CDMA systems (e.g., cdmaOne, CDMA2000), digital enhanced cordless telecommunications (DECT), digital AMPS (IS-136/TDMA), enhanced data rates for GSM evolution (EDGE), evolution-data optimized (EV-DO), general packet radio service (GPRS), global system for mobile communications (GSM), high-speed downlink packet access (HSDPA), integrated digital enhanced network (iDEN), land mobile radio (LMR), long term evolution (LTE) systems, low earth orbit (LEO) satellite internet technologies, massive multiple input multiple output (MIMO), millimeter-wave (mmWave) technologies for higher-speed wireless communication, new radio (NR), next-generation wireless systems (NGWS), universal mobile telecommunications system (UMTS), Wi-Fi 7 (802.11be), Wi-Fi Protected Access I & II (WPA, WPA2), wireless local area network (WLAN), worldwide interoperability for microwave access (WiMAX), etc. Each of these wired and wireless technologies discussed herein includes the transmission and reception of data, as well as the exchange of signaling and content messages. It should be noted that references to specific terminology and technical details pertaining to individual communications standards or technologies are provided solely for the purpose of illustration. These references should not be construed as narrowing the scope of the claims to any particular communication system or technology unless specifically recited in the claim language.

The terms "computing device," "user device" and "user equipment" (UE) may be used generically and interchangeably herein to refer to a broad range of devices such as, but not limited to, access nodes (AN), bridged residential gateways (BRG), cellular telephones, customer-premises equipment (CPE), digital video recorders (DVRs), home networking adapters, internet access gateways, laptops, modems, network switches, personal digital assistants (PDAs), portable multimedia players, rack-mounted computers, residential gateways (RG), routers, satellite or cable set-top boxes (STBs), smart televisions, smartphones, smartwatches, streaming media devices (for example, devices similar to ROKU™), tablet computers, voice-controlled assistants, wearable fitness and health-tracking devices, and wireless gaming controllers. These devices commonly include a programmable processor, memory, and/or circuitry for providing the functionality described herein.

The terms "component," "system," and the like may be used herein to refer to a computer-related entity, such as hardware, firmware, a combination of hardware and software, software, or software during its execution. These entities may be configured to carry out specific operations or functionalities. For example, a component may encompass a process operating on a processor, a processor itself, an object, an executable, a thread of execution, a program, or a computing device. As an illustrative example, both an application running on a computing device and the computing device itself could be termed a component. One or more components may be situated within a process and/or thread of execution and/or may be localized on a single processor or core or distributed across multiple processors or cores. In addition, these components may execute from various non-transitory computer-readable media that have various instructions and/or data structures stored thereon. Components may communicate by way of local and/or remote processes, function or procedure calls, electronic signals, data packets, memory read/writes, and other known computer, processor, and/or process-related communication technologies.

The term "processing system" is used herein to refer to one or more processors, including multi-core processors, that are organized and/or configured to perform various computing functions and/or to provide the functionality described herein. Various embodiment methods may be implemented in one or more of multiple processors within a processing system as described herein. As such, a computing device tasked with enacting the functionalities described herein may include a processing system with one or multiple processors. The computing device may be a standalone entity or a component of a system-on-chip (SoC). A SoC typically integrates multiple resources, which may encompass specialized processors such as a network, digital signal, or video processor. These specialized processors might be accompanied by memory blocks and other resources for efficient operation. The SoC may include software for controlling these integrated resources, as well as for managing peripheral devices.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC may include a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system also may include software for controlling integrated resources and processors, as well as for controlling peripheral devices.

The term "redundancy architecture" may be used herein to refer to a framework in which system components are duplicated to increase the reliability of the system. A system that implements a redundancy architecture may include alternative functional channels that could be used in the event that one component fails. In the context of splicers within a service provider network, a redundancy architecture may ensure that multiple backup splicers are available and ready to assume the primary splicer's functions should the primary splicer experience a fault or require maintenance. A well-designed redundancy architecture is desired for maintaining uninterrupted service and may be especially beneficial in systems that require high availability, such as those used in broadcasting and media streaming services.

The phrase "IP multicast technology" may be used herein to refer to a method of network communication that allows a single data stream to be transmitted from one source to multiple destinations simultaneously. IP multicast technology may be particularly beneficial in contexts such as advertisement insertion within a broadcasting environment in which a single advertisement server distributes advertisements to numerous splicers. By using IP multicast, a system may conserve network bandwidth and processing power and/or otherwise benefit from more streamlined operations (e.g., relative to unicast streaming in which separate data streams are sent to each recipient, etc.).

The term "splicer" may be used herein to refer to a computing device or system configured to integrate content, such as advertisements, into a media data stream without interrupting the continuity of that media data stream. Some embodiments may include a splicer that implements a redundancy architecture that helps ensure that service is uninterrupted and/or that content delivery is consistent across various outputs. The role of the splicer may extend to managing and synchronizing with cue requests (e.g., SCTE30 signals, etc.) to facilitate the precise insertion of advertisements at designated intervals as dictated by the broadcasting schedule or content delivery requirements.

The term "splicer redundancy architecture" may be used herein to refer to a systematic framework within which multiple splicers operate to provide a fail-safe mechanism for content delivery. This architecture may help ensure that in the event one or more splicer(s) fails or encounters an issue, others within the system can take over seamlessly, maintaining an uninterrupted service flow. In various embodiments, the splicer redundancy architecture may include any number of splicers and/or may be characterized by its ability to support parallel processing and fault tolerance through a multi-rail configuration.

The term "multi-rail splicer architecture" may be used herein to refer to a broadcast and media multi-rail transport system that employs multiple parallel pathways (known as 'rails'). This configuration may allow for continuous operation, even when one or more path(s) encounter issues, by providing an alternative rail that may carry the media stream without interruption. For ease of reference and focus the discussion on the relevant features, some of the embodiments are illustrated and described herein with reference to a dual rail system. However, it should be understood that the embodiments are applicable to multi-rail systems that include two or more rails. As such, nothing in this application should be used to limit the claims to a dual-rail architecture unless expressly recited as such in the claims.

The term "SCTE30" may be used herein to refer to a digital program insertion standard that is used within the broadcasting and media industry. SCTE30 may govern the message exchanges for advertisement insertion opportunities within a media stream. Specifically, SCTE30 cue request messages may be messages sent from splicing devices to an advertisement insertion server, conveying information about the precise timing and placement for ads within the programming content. These messages may facilitate the automated synchronization of advertisement insertion across various devices and platforms and/or help ensure that advertisements are embedded at designated intervals within the media stream.

The term "SCTE35" may be used herein to refer to a standard used within the broadcasting and media industry to specify signaling for indicating the insertion points for local content such as advertisements within a media stream. The SCTE35 standard outlines the cues for the start and end of media segments and allows for accurate placement of content by splicers and other related devices. In instances in which SCTE35 cues are missing or not properly received, the absence of the cues may lead to errors in content insertion. Such situations may highlight the necessity for reliable detection and handling of these signals to provide continuity and coherence in media streaming and advertisement placement.

For ease of reference, some embodiments are discussed with reference to broadcast. However, it should be understood that the term "broadcast" encompasses unicast and multicast, and nothing in this application should be interpreted as limiting to unicast, broadcast or multicast express recited as such in the claims.

The seamless integration of content (e.g., advertisements, etc.) into media data streams is an important feature of modern broadcasting and media services. Service providers frequently use splicers to integrate content into media data streams. Splicers are specialized tools that insert content into media data streams at designated times. SCTE30 and SCTE35 are industry-standard protocols that enable precise and timely insertion of content. SCTE35 signals may be embedded in the media data stream. These signals may be used to mark specific points for content insertion (e.g., advertisement insertion). The detection of SCTE35 signals by a splicer triggers the insertion of the designated content (e.g., advertisements, etc.) using SCTE30 protocol at the precise moment specified by the signal. This ensures that the content is placed accurately according to the predetermined broadcasting schedule, maintaining the continuity and quality of the media stream for viewers. The use of SCTE35 signals, SCTE30 messages, splicers and advertisement servers allows broadcasters to manage and alter their content seamlessly, without interrupting the flow or quality of the original media stream.

IP multicast technology allows for transmitting a single data packet or data stream to multiple destinations at the same time. This technology is particularly relevant in the context of advertisement servers broadcasting streams to splicers in a broadcasting network. By using IP multicast, an advertisement server may simultaneously send a single stream to multiple splicers. This capability presents an opportunity to create an enhanced splicer redundancy architecture and potentially improve the performance and functionality of the network and its components.

While IP multicast technology offers potential improvements in broadcasting efficiency and network performance, current models and technical constraints associated with existing and related solutions may impede the realization of any such benefits. For example, many current advertisement insertion solutions still rely on a one-to-one correspondence model in which a single advertisement server is paired with a single splicer. The one-to-one correspondence model limits the ability to broadcast an advertisement stream simultaneously to multiple splicers and/or is otherwise resource-intensive, complex, and/or inflexible.

There are additional limitations and technical challenges associated with current and related advertisement insertion solutions. For example, errors in processing cue signals, such as a missing SCTE35 cue, audio/video errors, and/or network errors, etc., may disrupt the overall advertisement insertion process.

These and other technical challenges and limitations may reduce the effectiveness of related solutions, particularly when scaling up for multiple channels or when integrating system redundancy. As a result, conventional solutions may experience inconsistent service and content delivery across multiple channels.

The various embodiments disclosed herein include devices equipped with components and processing systems configured to overcome these and other technical challenges and limitations associated with conventional solutions. In various embodiments disclosed herein, the processing system may be configured to perform operations for the smooth integration of content into media data streams within a multi-rail splicer architecture, transmit data via IP multicast technology, utilize or establish an improved splicer redundancy architecture, provide sophisticated error handling for advertisement insertion, analyze status codes and feedback pertinent to advertisement insertion, integrate advertisement beacons to aid in the advertisement insertion process, provide adjustable frequencies for advertisement beacons, and/or otherwise manage advertisement insertion in various unicast, broadcast, and/or multicast settings.

For example, in an embodiment, the processing system may be configured to use splicers, SCTE35 cue signals and SCTE30 messages for accurate content placement, broadcast a single advertisement stream to multiple destinations concurrently, manage multiple splicers within a redundancy architecture, provide continuous operation despite errors in cue signal processing (particularly SCTE35 cues), provide continuous operation despite audio/video stream errors or/and network errors etc., monitor and correct errors in advertisement insertion (including managing SCTE35 cue signal integrity, etc.), consolidate and reconcile different insertion results across multiple rails, evaluate discrepancies in advertisement insertion results based on SCTE30 command status codes and downstream feedback, use beacons to assist in detecting and verifying advertisement insertion results, incorporate beacons in advertisement assets for precise verification of advertisement insertion outcomes, adjust advertisement beacon frequencies for verifying different portions (beginning, middle, end etc.) of advertisement insertion, configure the system for advertisement insertion operations in a multi-rail system, manage a multi-splicer environment using IP multicast and integrated advertisement beacons, reduce infrastructure requirements by interfacing a single advertisement server with multiple splicers, send a uniform advertisement stream to all splicers via IP multicast, and/or allow or support adjustable frequencies for enhanced detection and synchronization within the advertisement stream.

In some embodiments, the processing system may be configured to implement a fault-tolerant method that allows a single advertisement server (or a cluster thereof, etc.) to broadcast a single advertisement stream to multiple splicers and/or to efficiently manage multiple splicers within a redundancy architecture.

In some embodiments, the processing system may be configured to maintain continuity in advertisement insertion operations even in the presence of errors in processing cue signals, such as missed SCTE35 cues in the multi-rail splicer architecture, audio/video stream errors and/or network errors etc. The processing system may implement an advanced error management system to monitor and maintain the signal integrity of SCTE35 cue signals. The processing system may take corrective actions in response to detecting errors in processing cue signals, audio/video stream errors and/or network errors etc.

In some embodiments, the processing system may be configured to analyze SCTE30 command status codes and feedback from downstream devices and reconcile differences between advertisement insertion results from different rails (parallel pathways).

In some embodiments, the processing system may be configured to integrate advertisement beacons into the media stream. These beacons may be used to assist in verifying the accuracy and timing of advertisement insertions and/or may enable the more automated management of the advertisement insertion process. The processing system may be configured to generate or provide adjustable advertisement beacon frequencies for dynamic control over insertion points and durations.

In some embodiments, the processing system may be configured to operate within a multi-rail splicer architecture, allow for a many-to-one relationship between multiple splicers and a single advertisement server, and/or receive IP multicast streams that include advertisement content and direct them to appropriate splicers based on real-time analysis of one or more factors (e.g., network conditions, splicer health, etc.).

In some embodiments, the processing system may be configured to offer a scalable solution that leverages a single advertisement server for multiple splicers. The processing system may improve the operational efficiency and reliability of the service provider network and its components to provide consistent advertisement delivery across diverse channels.

Various embodiments may be implemented on a number of single-processor and multiprocessor computer systems, including a system-on-chip (SOC) or system in a package (SIP). FIG. 1 illustrates an example computing system 100 architecture that may be used in a computing system implementing the various embodiments.

The example computing system 100 illustrated in FIG. 1 includes SoC 102, a clock 106, a voltage regulator 108, and wireless transceiver 166 configured to support contemporary wireless standards. The SoC 102 may include a digital signal processor (DSP) 110, a modem processor 112 tailored for the latest network standards, a graphics processor unit (GPU) 114, an application processor 116, various co-processors 118 (e.g., vector processors), deep learning processing units (DLPU) 121, artificial intelligence (AI) processors 122, along with memory 120 and system components and resources 124. An interconnection/bus module 126, temperature sensors 130, thermal management unit 132, and thermal power envelope (TPE) component 134 may also form part of the SoC.

In some embodiments, the SoC 102 may operate as the central processing unit (CPU) within a computing device, executing software application instructions and managing arithmetic, logical, control, and input/output (I/O) operations as specified. In some embodiments, the SoC 102 may interface with other components through the interconnection/bus module 126. The array of processors 110, 112, 114, 116, 118, 121, 122 may be interconnected and communicate with memory elements 120, system components, resources 124, and a thermal management unit 132 via interconnection/bus module 126, which may include a matrix of adaptable logic gates or embody a bus architecture such as CoreConnect or advanced microcontroller bus architecture (AMBA). Advanced interconnects, including high-performance network-on-chip (NoC) systems, may also be used to facilitate communications.

Each of the various processors 110, 112, 114, 116, 118, 121, 122 may include multiple cores, allowing independent operation from other processors or cores. For example, one part of SoC 102 may run an operating system such as LINUX, while another operates on a different platform, such as Microsoft Windows 10. In addition, any, some, or all of the processors 110, 112, 114, 116, 118, 121, 122 may be a part of a synchronous or asynchronous processor cluster architecture.

Any, some, or all of the processors 110, 112, 114, 116, 118, 121, 122 may operate as the CPU in the computing environment and/or may be nodes within one or more CPU clusters. CPU clusters are interconnected nodes configured for collaborative computing, with each node potentially running its own operating system with dedicated CPU, memory, and storage. Tasks assigned to a CPU cluster may be subdivided and processed in parallel, enhancing speed and reliability.

The SoC 102 may include or integrate various system components, resources, and specialized circuits for managing sensor inputs, converting analog signals to digital, managing wireless communications, and processing media content for applications like web browsers. These components and resources 124 may include but are not limited to, power amplifiers, voltage regulators, oscillators, phase-locked loops, peripheral bridges, memory and system controllers, and interfaces for peripheral devices such as cameras, displays, and wireless modules.

The SoC 102 may also include an input/output module for interfacing with external components like the clock 106, voltage regulator 108, and a state-of-the-art wireless transceiver 166, supporting the latest communication protocols. These external resources may be allocated among various internal SoC processors or cores to improve performance.

In addition to the example SoC 102 discussed above, various embodiments may be implemented in a wide variety of computing systems, which may include a single processor, multiple processors, multicore processors, or any combination thereof.

Figure 2:
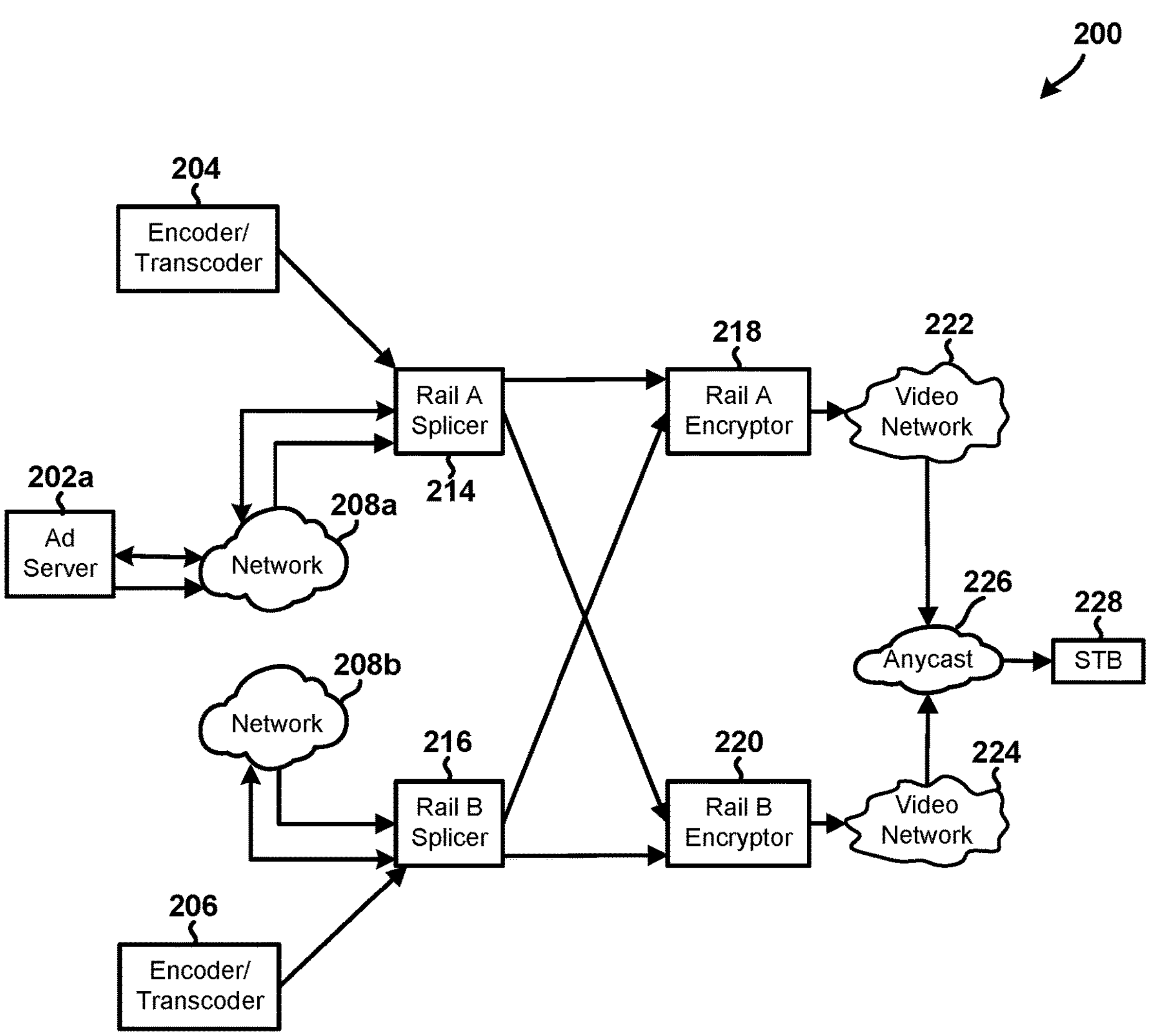
FIGS. 2 and 3 are block diagrams illustrating multi-rail transport systems that include an advertising server in accordance with the embodiments.
Figure 3:
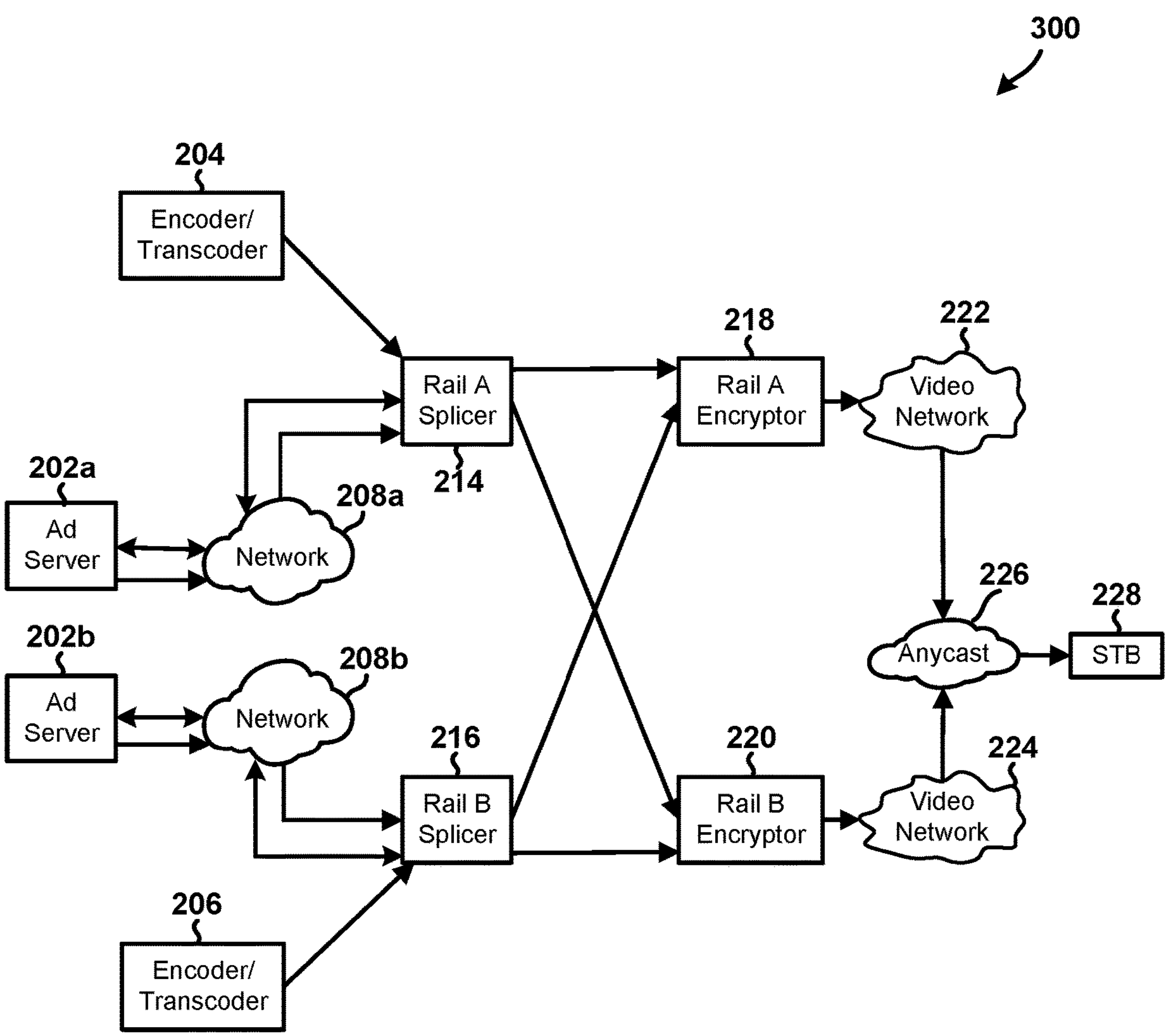

FIGS. 2 and 3 are block diagrams illustrating multi-rail transport systems 200, 300 that include an advertising server in accordance with the embodiments. In the examples illustrated in FIGS. 2 and 3, the multi-rail transport systems 200, 300 include advertising servers 202, 202*a*, 202*b*, encoder/transcoders 204, 206, network 208 (208*a*, 208*b*) components, splicers 214, 216, encryptors 218, 220, video networks 222, 224, anycast network 226, and a set-top-box (STB) 228. Rail A splicer 214 may operate as the "primary" splicer and rail B splicer 216 may operate as the "backup" splicer. As such, the systems 200, 300 may attempt to prioritize the output to the STB 228 on the rail A splicer 214 as much as possible.

The advertising servers 202, 202*a*, 202*b* may be configured to manage and distribute advertising content. System 200 illustrated in FIG. 2 includes a single ad server 202, which may be limited to delivering content to one rail digital program insertion (DPI) splicer. System 300 illustrated in FIG. 3 includes multiple ad servers 202*a*, 202*b*, which may allow for independent content delivery to both rails of the dual rail system.

The encoders/transcoder 204, 206 may be configured to process and encode the video content into a suitable digital format for transmission and ensure that the content is compatible with various devices and transmission protocols. The network components 208 (208*a*, 208*b*) may include infrastructure supporting data transmission, such as routers, switches, and other networking devices, facilitating communication and data flow within the content delivery systems.

The splicers 214, 216 may be configured to insert the advertising content into the media data streams. The examples illustrated in FIGS. 2 and 3 include two splicers, one for each rail (Rail A splicer 214 as the primary, and Rail B splicer 216 as the backup), ensuring that advertisements are inserted appropriately into the respective media data streams.

The encryptors 218, 220 may be configured to secure the video content by encrypting it before transmission to provide content security and prevent unauthorized access or distribution. The video networks 222, 224 may include infrastructure for content broadcasting and distribution channels through which the video content may be transmitted to the end viewers. The anycast network 226 may include network architecture that allows the efficient routing of data to multiple receivers using the nearest or best available source. The STB 228 may be the endpoint for the content delivery systems and/or may configured to receive and decode the broadcast media data content (e.g., for display on television sets, etc.).

The multi-rail transport system 200 illustrated in FIG. 2 is configured to splice content to only a single rail digital program insertion (DPI) splicer. The multi-rail transport system 300 illustrated in FIG. 3 implements a first advertising server 202*a* and a second advertising server 202*b* to enable independent splicing of advertising content on both rails 214, 216 of the multi-rail transport system.

Multi-rail transport architectures increase system reliability but have also presented new technical challenges. A notable issue arises in the delivery of advertising content via digital program insertion (DPI) in such systems. Related advertisement servers are generally limited to delivering and streaming advertising content to a single splicer at a time. FIG. 2 illustrates that this limitation may be particularly evident in multi-rail transport systems, in instances in which a failover occurs to the rail B splicer 216, the advertising content would not be spliced on that lower rail due to the advertising server 202 being restricted to the rail A splicer 214. FIG. 3 illustrates an interim solution that installs a second advertising server **202*b* configured for rail B splicer 216. However, this approach presents the challenge of consolidating verification files from ad servers 202*a* and 202*b*** in both rails, into a single file for the traffic and billing system. This necessity highlights the need for more adaptable and flexible advertisement delivery systems that may accommodate these and other complexities of modern broadcasting architectures.

Figure 4:
FIG. 4 is a block diagram illustrating a multi-rail transport system 400 that includes an enhanced advertising server configured in accordance with the various embodiments.
Figure 4:
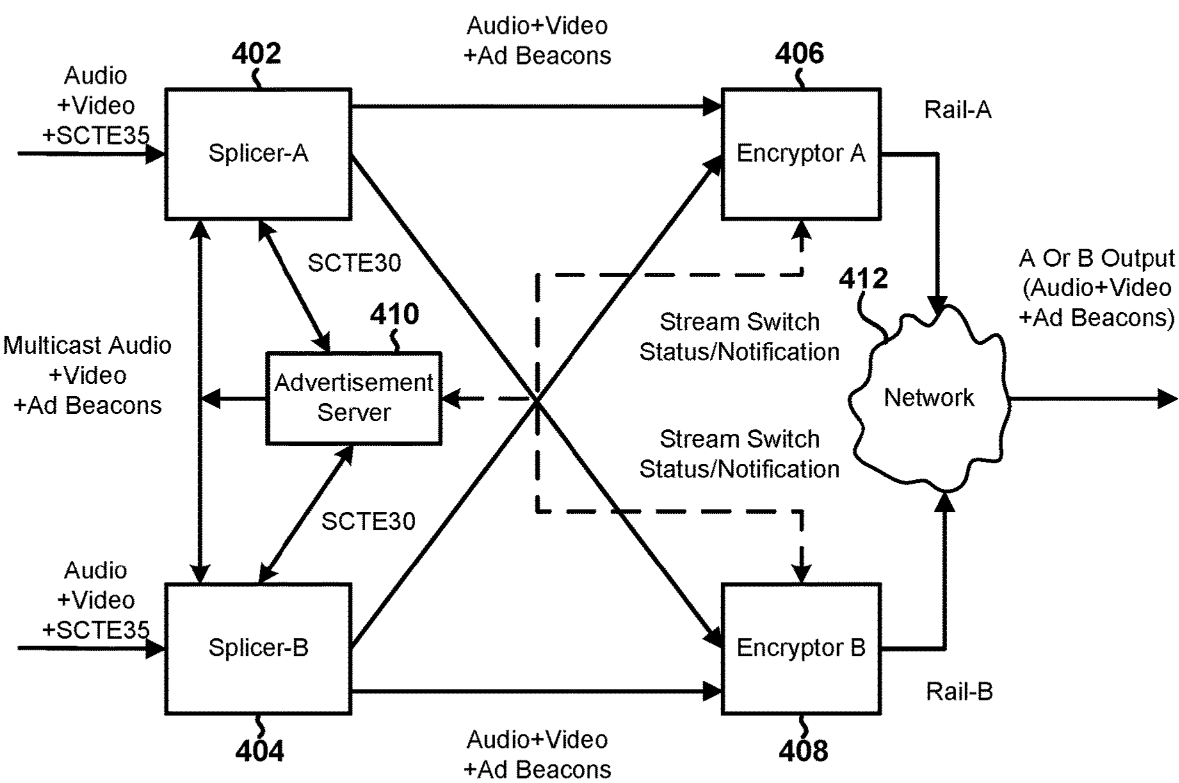

FIG. 4 is a block diagram illustrating a multi-rail transport system 400 that includes an enhanced advertising server 410 configured in accordance with various embodiments disclosed herein. In the embodiment illustrated in FIG. 4, the multi-rail transport system 400 includes a splicer-A 402, splicer-B 404, encryptor-A 406, encryptor-B 408, advertisement server 410, and network 412.

The multi-rail transport system 400 may overcome the above-described technical challenges associated with the implementation of multi-rail transport architectures by enhancing the capabilities of the advertising server 410. The advertising server 410 may be configured to support multicast delivery for advertising content and simultaneously transmit advertising content to multiple splicers (e.g., splicer-A 402 and splicer-B 404) irrespective of their association with rail A or rail B.

In some embodiments, the advertising server 410 may be configured to support SCTE-30 communications on both rail A and rail B. That is, the advertising server 410 may communicate with both splicers using the SCTE-30 messages. The splicers (e.g., splicer-A 402 and splicer-B 404) may send a cue request (SCTE30) to the advertising server 410. In response to receiving a cue request from either splicer, the advertising server 410 may initiate ad insertion by sending SCTE30 splice request messages to both splicer-A 402 and splicer-B 404. The advertising server 410 may send a single advertisement stream that includes audio, video, and ad beacons to both splicer-A 402 and splicer-B 404. This advertisement stream may be multicast so that the advertisement stream is sent simultaneously to multiple recipients.

The splice time contained in the splice request may match the time indicated in the cue request from the splicer in one rail (e.g., splicer-A 402) that first sends the cue request. For the other rails, in instances in which the advertisement server receives the cue request from the splicer in the rail before the splice request is sent, it also uses the splice time contained in the cue request. Otherwise, its splice time may be adjusted based on the splice time difference between the rail and the first rail from the previous break. The difference may be capped to a configurable value so that spike in timing difference caused by network outage etc. does not impact the splice time in the future breaks. To ensure synchronization, the splicer with a later splice time may buffer the ad stream and insert it at the correct time.

In some embodiments, the advertising server 410 may be configured to consolidate verification files from each rail to overcome the technical challenges associated with the interim solution illustrated in FIG. 3. In some embodiments, the advertising server 410 may gather and merge verification data from splicers 402, 404 across both rail A and rail B. This consolidation may allow for generating and sending a single, comprehensive verification file to the traffic and billing system for processing, may simplify the process of verification, may reduce the potential for errors, and/or may streamline the workflow for traffic and billing system processing.

In some embodiments, the advertising server 410 may be configured with splicer support for source specific multicast (SSM) joins for advertising content. SSM may be more efficient form of multicast in which receivers indicate interest in receiving content from specific sources. This feature may enhance the network's efficiency by ensuring that only the intended splicers join and receive the multicast stream from the advertising server 410.

In some embodiments, the components may be configured to consolidate the ad insertion results. In some embodiments, the components may consolidate the ad insertion results without feedback from downstream devices. In some embodiments, the components may be configured so that a failure in any rail results in a consolidated result of "failure" (except for certain error codes). In some embodiments, the components may be configured so that a success in any rail leads to a consolidated result of "success." In some embodiments, the system 400 may include configurable settings and allow selection between these two techniques (i.e., failure in any rail vs. success in any rail).

In some embodiments, the components may consolidate the ad insertion results with feedback from downstream devices. In some embodiments, the advertising server 410 may be configured to receive status notifications about which rail is active from downstream devices, and consolidate the results based on the outcome from the active rail. In some embodiments, the components may consolidate the ad insertion results based on ad beacon presence at the output point. The components may report "success" in instances in which ad beacons are present in the output and "failure" if not all required ad beacons are detected.

In some embodiments, the components may be configured to implement redundancy and error handling, which may include switching between splicers in case of a failure or error condition in one splicer. The advertising server 410 multicasting to both splicers simultaneously may provide redundancy and/or help ensure that ad insertion continues unaffected regardless of which rail is primary at any given moment.

In some embodiments, the components may be configured to reduce or minimize the impact of missing SCTE 35 cues for ad insertion. In some embodiments, the components may be configured to manage the timing between two separate splicers to ensure seamless ad insertion. In some embodiments, the components may be configured to consolidate results from both rails, with or without feedback from downstream devices. The embodiments may enhance reliability by providing a failover mechanism between the two rails.

Figure 5:
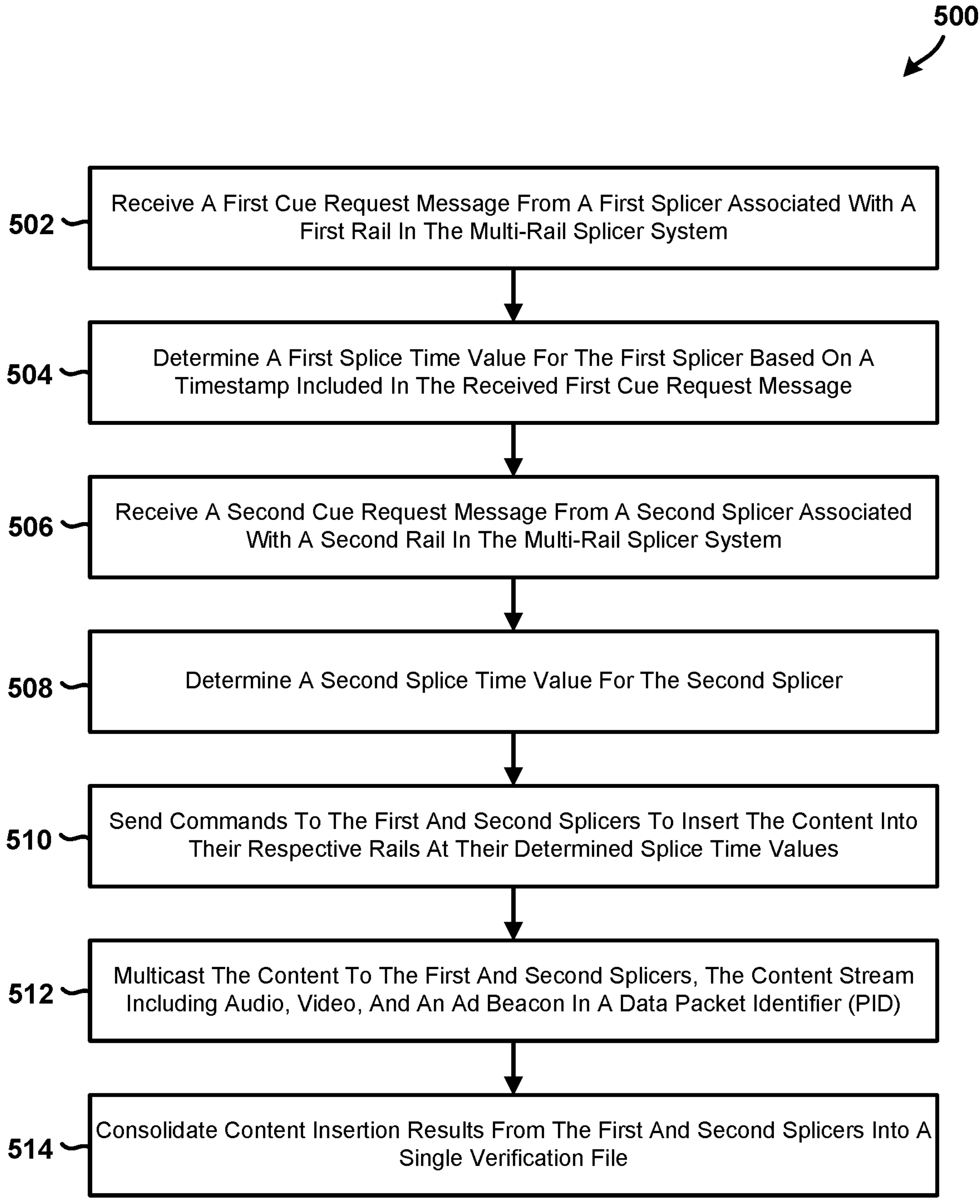
FIG. 5 is a process flow diagram illustrating a method of inserting content in a multi-rail splicer system in accordance with the various embodiments.

FIG. 5 is a process flow diagram illustrating a method 500 of inserting content in a multi-rail splicer system. With reference to FIGS. 1-5, method 500 may be performed in a server computing device that implements an advertisement server by a processing system encompassing a memory and at least one processor, component, or subsystem discussed in this application. Means for performing the functions of the operations in the method 500 may include memory, a processing system including at least one processor, and other components described herein. Further, one or more processors of the processing system may be configured with software or firmware to perform some or all of the operations of the method 500. In order to encompass the alternative configurations enabled in various embodiments, the hardware implementing any or all of method 500 is referred to herein as a "processing system" or "at least one processor."

In block 502, the processing system may receive a first cue request message from a first splicer (e.g., splicer-A 402 or splicer-B 404) associated with a first rail (e.g., rail-A or rail-B) in the multi-rail splicer system. In some embodiments, the receipt of the first cue request message may cause the processing system to initiate the content insertion operations. In some embodiments, the first cue request message may include a timestamp indicating the precise moment at which the first splicer is ready to insert content into the media stream. In some embodiments, the first cue request message may also include a splicer identifier, cue signal information, rail information, and various other parameters, such as the preferred format of the advertisement, priority level, instructions for handling the insertion (e.g., fade-in, fade-out durations), etc.

The processing system may receive the first cue request message due to various triggers and conditions in the broadcast workflow. A common trigger is a pre-scheduled time for advertisement insertion. Broadcast schedules often have predefined slots for advertisements. The splicer may monitor and detect the program boundaries in the stream against the schedule and automatically generate the cue request message when the broadcast stream approaches a predefined slot for advertisements.

In some systems, cue signals (e.g., SCTE35 markers, etc.) embedded in the media data stream may indicate the points for advertisement insertion. The splicers may continuously scan the media data stream for these cue signals. Upon detecting a cue signal, a splicer may send a cue request message to the processing system to initiate the ad insertion process.

In block 504, the processing system may determine a first splice time value for the first splicer based on a timestamp included in the received first cue request message. The first splice time value may be used for the insertion of content at the intended point in the media stream, aligning with the scheduled broadcast timing.

In block 506, the processing system may receive a second cue request message from a second splicer associated with a second rail in the multi-rail splicer system. In some embodiments, the processing system may determine whether the second cue request message was received before a predetermined time threshold value. For example, the processing system may compare the timestamp within the second cue request message against a threshold value that was established based on the broadcast schedule or the timing requirements of the inserted content. The processing system may also use its internal clock or a reference time source to assess the actual time of receipt of the second cue request message and determine whether this time falls before or after the predetermined threshold. In some embodiments, the processing system may perform these and other operations to maintain synchronization between multiple splicers and ensure a seamless content insertion process.

In block 508, the processing system may determine a second splice time value for the second splicer. The processing system may determine the second splice time value based on a timestamp included in the received second cue request message in response to determining that the second cue request message is received before the time threshold value. The processing system may determine the second splice time value based on an adjusted time value determined based on the time difference between the first and second splicers from a previous ad insertion break in response to determining that the second cue request message is not received before the time threshold value. The adjusted time value may be based on the time difference between the first and second splicers from a previous ad insertion break, ensuring coordinated content insertion despite timing discrepancies.

In block 510, the processing system may send commands to the first and second splicers to cause them to insert the content stream into their respective rails at their determined splice time values. The processing system may use these commands to help ensure that each splicer inserts the content precisely at the scheduled times.

In block 512, the processing system may multicast the advertisement content to the first and second splicers, the content stream including audio, video, and an ad beacon in a data packet identifier (PID). In some embodiments, multicasting the content stream to the first and second splicers may include synchronizing the transmission of the content stream with the determined first and second splice times. The multicasting operations may allow for simultaneous content delivery to multiple splicers.

In block 514, the processing system may consolidate the content insertion results from the first and second splicers into a single verification file. In some embodiments, the processing system may consolidate the content insertion results so that the consolidated result is marked as a success in response to determining that the content insertion results from the first or second splicer indicate a success. In some embodiments, the processing system may consolidate the content insertion results so that the consolidated result is marked as a failure in response to determining that the content insertion results from the first or second splicer indicate a failure. In some embodiments, the processing system may mark the consolidated result as a failure in response to determining that the content insertion results from the first or second splicer indicate a failure from an error code that is indicative of a critical failure. In some embodiments, the processing system may mark the consolidated result as a success in response to determining that the content insertion results from the first or second splicer indicate a failure from an error code that is indicative of a non-critical failure.

Thus, the consolidation operations may involve marking the consolidated result as a success if the content insertion results from either the first or second splicer indicate a success. Conversely, the consolidated result may be marked as a failure if the content insertion results from either splicer indicate a failure, particularly in cases of critical failures as indicated by specific error codes. In instances of non-critical failures, the consolidated result may still be marked as a success, offering flexibility in handling minor discrepancies.

In some embodiments, consolidating the content insertion results from the first and second splicers into the single verification file in block 514 may include consolidating the content insertion results based on feedback from downstream devices indicating an active rail.

In some embodiments, method 500 may further include determining the success of the content insertion operations based on the presence of the ad beacon in the PID. The ad beacon may serve to operate as a verification tool, confirming the accurate placement and timing of the content insertion. The presence of the ad beacon in the output stream is an indicator of successful content integration.

Figure 6:
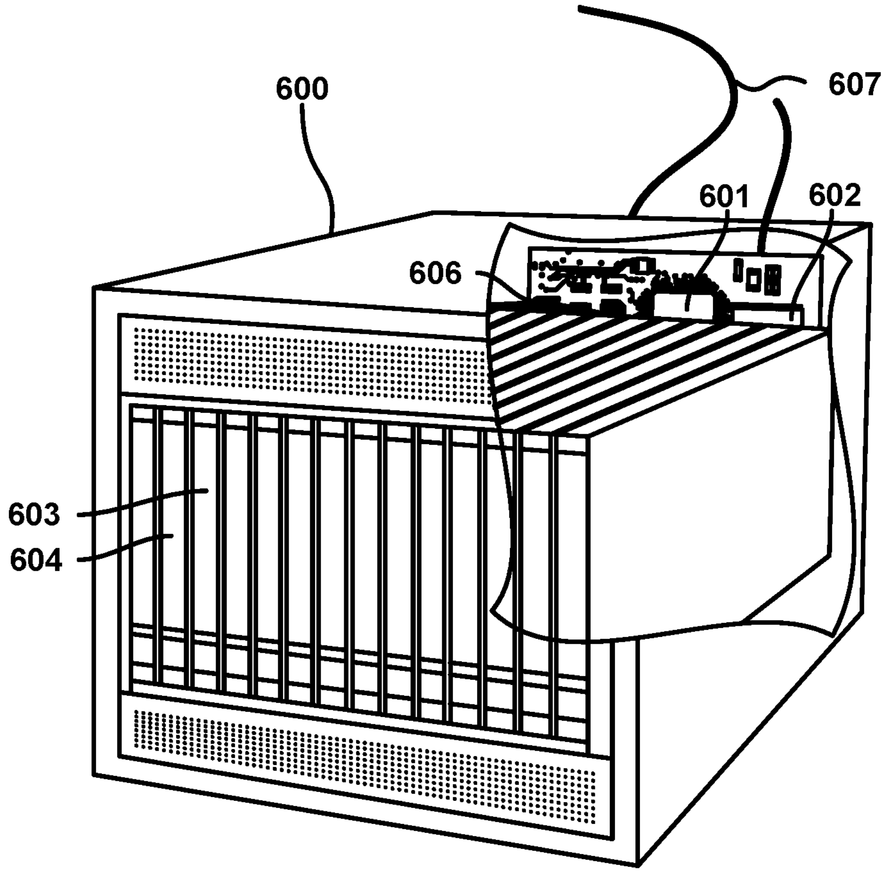
FIG. 6 is a component diagram of an example server suitable for implementing some embodiments.

Some embodiments may be implemented on any of a variety of commercially available computing devices, such as the server computing device 600 illustrated in FIG. 6. Such a server device 600 may include a processor 601 coupled to volatile memory 602 and a large capacity non-volatile memory, such as a disk drive 603. The server device 600 may also include a floppy disc drive, USB, etc. coupled to the processor 601. The server device 600 may also include network access ports 606 coupled to the processor 601 for establishing data connections with a network connection circuit 604 and a communication network 607 (e.g., an Internet protocol (IP) network) coupled to other communication system network elements.

The processors or processing units discussed in this application may be any programmable microprocessor, microcomputer, or multiple processor chip or chips that can be configured by software instructions (applications) to perform a variety of functions, including the functions of various embodiments described. In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method performed by a server computing device in a multi-rail splicer system to insert content in the multi-rail splicer system, including: receiving, by a processing system in the server computing device, a first cue request message from a first splicer associated with a first rail in the multi-rail splicer system, determining a first splice time value for the first splicer based on a time included in the received first cue request message, receiving a second cue request message from a second splicer associated with a second rail in the multi-rail splicer system, determining a second splice time value for the second splicer, sending commands to the first and second splicers to insert the content stream into their respective rails at their determined splice time values, sending commands to the first and second splicers to insert the content stream into their respective rails at their determined splice time values, multicasting a content stream to the first and second splicers, the content stream including audio, video, and an ad beacon in a data packet identifier (PID), and consolidating content insertion results from the first and second splicers into a single verification file.

Example 2: The method of example 1, further including determining whether the second cue request message is received before a time threshold value, wherein determining the second splice time value for the second splicer comprises determining the second splice time value for the second splicer based on one of: a timestamp included in the received second cue request message in response to determining that the second cue request message is received before the time threshold value, or an adjusted time value determined based on a time difference between the first and second splicers from a previous ad insertion break in response to determining that the second cue request message is not received before the time threshold value.

Example 3: The method of any of the examples 1 and 2, wherein consolidating the content insertion results from the first and second splicers into the single verification file comprises consolidating the content insertion results so that: the consolidated result is marked as a failure in response to determining that the content insertion results from the first or second splicer indicate a failure, or the consolidated result is marked as a success in response to determining that the content insertion results from the first splicer or the second splicer indicate a success.

Example 4: The method of any of the examples 1-3, further wherein consolidating the content insertion results so that the consolidated result is marked as a failure in response to determining that the content insertion results from the first splicer or the second splicer indicate a failure includes: marking the consolidated result as a failure in response to determining that the content insertion results from the first splicer or the second splicer indicate a failure from an error code that is indicative of a critical failure, and marking the consolidated result as a success in response to determining that the content insertion results from the first splicer or the second splicer indicate a failure from an error code that is indicative of a non-critical failure.

Example 5: The method of any of the examples 1-4, wherein consolidating the content insertion results from the first splicer and the second splicer into the single verification file comprises consolidating the content insertion results based on feedback from downstream devices indicating an active rail.

Example 6: The method of any of the examples 1-5, further including determining success of content insertion operations based on a presence of the ad beacon in the PID.

Example 7: The method of any of the examples 1-6, wherein multicasting the content stream to the first splicer and the second splicer comprises synchronizing transmission of the content stream with the determined first splice time and second splice time.

Example 8: The method of any of the examples 1-7, wherein receiving the first cue request message from the first splicer associated with the first rail in the multi-rail splicer system further comprises monitoring program boundaries in the stream against a schedule and automatically generating the cue request message when the stream approaches a predefined slot for advertisements.

A number of different types of memories and memory technologies are available or contemplated in the future, any or all of which may be included and used in systems and computing devices that implement the various embodiments. Such memory technologies/types may include dynamic random-access memory (DRAM), double data rate synchronous dynamic random-access memory (DDR SDRAM), electronic (Solid-State) non-volatile computer storage mediums (e.g., Flash Memory), ferroelectric RAM (F-RAM), field programmable read-only memory (FPROM), magnetoresistive RAM (M-RAM), non-volatile random-access memories (NVRAM), one-time programmable non-volatile memory (OTP NVM), phase-change random-access memory (PC-RAM, PRAM, or PCM), programmable read-only memory (PROM), pseudostatic random-access memory (PSRAM), resistive random access memory (ReRAM or RRAM), spin-transfer torque magnetoresistive random-access memory (STT-MRAM), static random-access memory (SRAM), three-dimensional cross point (3D XPoint) memory. Each of the above-mentioned memory technologies includes, for example, elements suitable for storing instructions, programs, control signals, and/or data for use in a computing device, system on chip (SOC) or other electronic component. Any references to terminology and/or technical details related to an individual type of memory, interface, standard, or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application-specific integrated circuit (TCUASIC), a field programmable gate array (FPGA) or other programmable logic devices, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of inserting content in a multi-rail splicer system, comprising:

receiving, by a processing system in a server computing device, a first cue request message from a first splicer associated with a first rail in the multi-rail splicer system;

determining a first splice time value for the first splicer based on a time included in the received first cue request message;

receiving a second cue request message from a second splicer associated with a second rail in the multi-rail splicer system;

determining a second splice time value for the second splicer;

sending commands to the first and second splicers to insert a content stream into their respective rails at their determined splice time values;

multicasting the content stream to the first and second splicers, the content stream including audio, video, and an ad beacon in a data packet identifier (PID); and consolidating content insertion results from the first and second splicers into a single verification file by marking a consolidated result as a success in response to determining that the content insertion results from the first splicer or the second splicer indicate a failure from an error code that is indicative of a non-critical failure.

2. The method of claim 1, further comprising:

determining whether the second cue request message is received before a time threshold value, wherein determining the second splice time value for the second splicer comprises determining the second splice time value for the second splicer based on one of:

a timestamp included in the received second cue request message in response to determining that the second cue request message is received before the time threshold value; or an adjusted time value determined based on a time difference between the first and second splicers from a previous ad insertion break in response to determining that the second cue request message is not received before the time threshold value.

3. The method of claim 1, wherein the consolidated result is marked as a success in response to determining that the content insertion results from the first splicer or the second splicer indicate a success.

4. The method of claim 1, wherein the consolidating further comprises:

marking the consolidated result as a failure in response to determining that the content insertion results from the first splicer or the second splicer indicate a failure from an error code that is indicative of a critical failure.

5. The method of claim 1, wherein the consolidating further comprises consolidating the content insertion results based on feedback from downstream devices indicating an active rail.

6. The method of claim 1, further comprising determining success of content insertion operations based on a presence of the ad beacon in the PID.

7. The method of claim 1, wherein multicasting the content stream to the first splicer and the second splicer comprises synchronizing transmission of the content stream with the determined first and second splice time values.

8. The method of claim 1, wherein receiving the first cue request message from the first splicer associated with the first rail in the multi-rail splicer system further comprises monitoring program boundaries in the content stream against a schedule and automatically generating the first cue request message when the content stream approaches a predefined slot for advertisements.

9. A computing device, comprising:

a memory; and at least one processor coupled to the memory, wherein the at least one processor is configured to:

receive a first cue request message from a first splicer associated with a first rail in a multi-rail splicer system;

determine a first splice time value for the first splicer based on a time included in the received first cue request message;

receive a second cue request message from a second splicer associated with a second rail in the multi-rail splicer system;

determine a second splice time value for the second splicer;

send commands to the first and second splicers to insert a content stream into their respective rails at their determined splice time values;

multicast the content stream to the first and second splicers, the content stream including audio, video, and an ad beacon in a data packet identifier (PID); and consolidate content insertion results from the first and second splicers into a single verification file by marking a consolidated result as a success in response to determining that the content insertion results from the first splicer or the second splicer indicate a failure from an error code that is indicative of a non-critical failure.

10. The computing device of claim 9, wherein the at least one processor is configured to:

determine whether the second cue request message is received before a time threshold value, wherein determining the second splice time value for the second splicer comprises determining the second splice time value for the second splicer based on one of:

a timestamp included in the received second cue request message in response to determining that the second cue request message is received before the time threshold value; or an adjusted time value determined based on a time difference between the first and second splicers from a previous ad insertion break in response to determining that the second cue request message is not received before the time threshold value.

11. The computing device of claim 9, wherein the consolidated result is marked as a success in response to determining that the content insertion results from the first splicer or the second splicer indicate a success.

12. The computing device of claim 9, wherein the at least one processor is configured such that the consolidating further comprises:

marking the consolidated result as a failure in response to determining that the content insertion results from the first splicer or the second splicer indicate a failure from an error code that is indicative of a critical failure.

13. The computing device of claim 9, wherein the at least one processor is configured such that the consolidating further comprises consolidating the content insertion results based on feedback from downstream devices indicating an active rail.

14. The computing device of claim 9, wherein the at least one processor is configured to determine success of content insertion operations based on a presence of the ad beacon in the PID.

15. The computing device of claim 9, wherein the at least one processor is configured to multicast the content stream to the first splicer and the second splicer by synchronizing transmission of the content stream with the determined first and second splice time values.

16. The computing device of claim 9, wherein the at least one processor is configured to:

receive the first cue request message from the first splicer associated with the first rail in the multi-rail splicer system by monitoring program boundaries in the content stream against a schedule and automatically generating the first cue request message when the content stream approaches a predefined slot for advertisements.

17. A non-transitory processor readable media having stored thereon processor-executable instructions configured to cause a processing system in a server computing device in a multi-rail splicer system to perform operations for content insertion, the operations comprising:

receiving a first cue request message from a first splicer associated with a first rail in the multi-rail splicer system;

determining a first splice time value for the first splicer based on a time included in the received first cue request message;

receiving a second cue request message from a second splicer associated with a second rail in the multi-rail splicer system;

determining a second splice time value for the second splicer;

sending commands to the first and second splicers to insert a content stream into their respective rails at their determined splice time values;

multicasting the content stream to the first and second splicers, the content stream including audio, video, and an ad beacon in a data packet identifier (PID); and consolidating content insertion results from the first and second splicers into a single verification file by marking a consolidated result as a success in response to determining that the content insertion results from the first splicer or the second splicer indicate a failure from an error code that is indicative of a non-critical failure.

18. The non-transitory processor readable media of claim 17, wherein the stored processor-executable instructions are configured to cause the processing system to perform operations further comprising:

determining whether the second cue request message is received before a time threshold value, wherein determining the second splice time value for the second splicer comprises determining the second splice time value for the second splicer based on one of:

a timestamp included in the received second cue request message in response to determining that the second cue request message is received before the time threshold value; or an adjusted time value determined based on a time difference between the first and second splicers from a previous ad insertion break in response to determining that the second cue request message is not received before the time threshold value.

19. The non-transitory processor readable media of claim 17, wherein the consolidated result is marked as a success in response to determining that the content insertion results from the first splicer or the second splicer indicate a success.

20. The non-transitory processor readable media of claim 17, wherein the stored processor-executable instructions are configured to cause the processing system to perform operations such that the consolidating further comprises:

marking the consolidated result as a failure in response to determining that the content insertion results from the first splicer or the second splicer indicate a failure from an error code that is indicative of a critical failure.

21. The non-transitory processor readable media of claim 17, wherein the stored processor-executable instructions are configured to cause the processing system to perform operations such that the consolidating further comprises consolidating the content insertion results based on feedback from downstream devices indicating an active rail.

22. The non-transitory processor readable media of claim 17, wherein the stored processor-executable instructions are configured to cause the processing system to perform operations further comprising:

determining success of content insertion operations based on a presence of the ad beacon in the PID.

23. The non-transitory processor readable media of claim 17, wherein the stored processor-executable instructions are configured to cause the processing system to perform operations such that the multicasting the content stream to the first splicer and the second splicer comprises synchronizing transmission of the content stream with the determined first and second splice time values.

24. The non-transitory processor readable media of claim 17, wherein the stored processor-executable instructions are configured to cause the processing system to perform operations such that the receiving the first cue request message from the first splicer associated with the first rail in the multi-rail splicer system further comprises monitoring program boundaries in the content stream against a schedule and automatically generating the first cue request message when the content stream approaches a predefined slot for advertisements.

* * * * *